US011839812B2

(12) United States Patent
McIntosh (10) Patent No.: US 11,839,812 B2
(45) Date of Patent: Dec. 12, 2023

(54) ONLINE GAMING PLATFORM SYSTEMS, METHODS, AND APPARATUS

(71) Applicant: Jeremy McIntosh, Springfield Gardens, NY (US)

(72) Inventor: Jeremy McIntosh, Springfield Gardens, NY (US)

(*) Notice: Subject to any disclaimer, the term of this patent is extended or adjusted under 35 U.S.C. 154(b) by 0 days.

(21) Appl. No.: 17/531,147

(22) Filed: Nov. 19, 2021

(65) Prior Publication Data

US 2022/0152487 A1 May 19, 2022

Related U.S. Application Data

(60) Provisional application No. 63/115,710, filed on Nov. 19, 2020.

(51) Int. Cl.
*A63F 13/35* (2014.01)

(52) U.S. Cl.
CPC .................................. *A63F 13/35* (2014.09)

(58) Field of Classification Search
None
See application file for complete search history.

(56) References Cited

U.S. PATENT DOCUMENTS

| 7,515,718 | B2 | 4/2009 | Nguyen et al. |
|---|---|---|---|
| 7,618,317 | B2 | 11/2009 | Jackson |
| 8,911,293 | B2 | 12/2014 | Cahill et al. |
| 9,555,322 | B2 | 1/2017 | Crowder, Jr. et al. |
| 9,685,034 | B2 | 6/2017 | Weber et al. |
| 10,245,510 | B2 | 4/2019 | Kim et al. |
| 10,268,985 | B1 | 4/2019 | Grimaldi et al. |
| 10,706,660 | B2 | 7/2020 | LeMay et al. |
| 2008/0234047 | A1 | 9/2008 | Nguyen |
| 2012/0190441 | A1 | 7/2012 | Crowder, Jr. |
| 2013/0268393 | A1* | 10/2013 | Haze ............... A63F 13/67 705/26.7 |
| 2014/0228101 | A1 | 8/2014 | Baerlocher |
| 2015/0238876 | A1* | 8/2015 | Millegan ............ A63F 13/87 463/42 |

(Continued)

OTHER PUBLICATIONS

IXXO Ecommerce Solutions, "Multi-vendor," Web Page, <https://www.ixxocart.com/multivendor-software/>, Aug. 21, 2020.

(Continued)

*Primary Examiner* — Ronald Laneau
(74) *Attorney, Agent, or Firm* — Rita C. Chipperson, Esq.; Chipperson Law Group, P.C.

(57) ABSTRACT

Systems, methods and apparatus are disclosed involving an online gaming platform, and in a particular embodiment, to an entertainment and educational system involving a marketplace comprising a plurality of vendors, a plurality of marketplace video games, and a plurality of game configurations; wherein each marketplace video game of the plurality of marketplace video games is available from at least one vendor of the plurality of vendors; wherein each game configuration of the plurality of game configurations is available from at least one vendor of the plurality of vendors for use with or within at least one configurable video game; and wherein each configurable video game is one of the plurality of marketplace video games available on the marketplace, or a third-party video game not available on the marketplace.

19 Claims, 5 Drawing Sheets

(56) References Cited

U.S. PATENT DOCUMENTS

2018/0036639 A1  2/2018 Reid et al.
2022/0139050 A1* 5/2022 Rodriguez ............ G06T 19/006
                                                345/633

OTHER PUBLICATIONS

Bolide Network, LLC, "Game clone script," Web Page, <https://www.cs-cart.com/game-clone-script.html>, Aug. 21, 2020.

* cited by examiner

ONLINE GAMING PLATFORM SYSTEMS, METHODS, AND APPARATUS

CROSS REFERENCE TO RELATED APPLICATION

This application is related to and claims the benefit of U.S. Provisional Patent Application Ser. No. 63/115,710 ("the '710 application"), titled "Online Gaming Platform Systems, Methods, and Apparatus," and filed Nov. 19, 2020, which is incorporated by reference herein in its entirety for all purposes.

BACKGROUND OF THE INVENTION

The invention relates to systems, methods and apparatus involving an online gaming platform, and in a particular embodiment, to an entertainment and educational system involving a marketplace comprising a plurality of vendors, a plurality of video games, and a plurality of game configurations, wherein each game configuration of the plurality of game configurations is available from at least one vendor of the plurality of vendors for use with or within at least one configurable video game.

The related art includes, for instance, online gaming platforms that offer video games for downloading or streaming, either for free, for purchase, for rent, or for a combination thereof. Prior art video game platforms offer for downloading or streaming video games from one or more vendors, and each vendor may choose to offer a video game for free, for purchase, for rent, or for a combination thereof. Prior art video games may be played by a first player against at least one system-generated opponent, against at least one player opponent, or against both, and in some cases, the first player and at least one additional player may team together to play against at least one system-generated opponent, against at least one player opponent, or against both.

As described below, embodiments of the present invention include the use of novel features within an online gaming platform comprising an entertainment and educational system involving decentralized, user-based creation and/or distribution of games and game configurations, using systems and methods different from those of the prior art systems and methods.

BRIEF SUMMARY OF THE INVENTION

The invention relates to systems, methods and apparatus involving an online gaming platform, and in a particular embodiment, to an entertainment and educational system involving a marketplace comprising a plurality of vendors, a plurality of marketplace video games, and a plurality of game configurations; wherein each marketplace video game of the plurality of marketplace video games is available from at least one vendor of the plurality of vendors; wherein each game configuration of the plurality of game configurations is available from at least one vendor of the plurality of vendors for use with or within at least one configurable video game; and wherein each configurable video game is one of the plurality of marketplace video games available on the marketplace, or a third-party video game not available on the marketplace.

Each vendor of the plurality of vendors may offer at least one marketplace video game, and/or at least one game configuration of the plurality of game configurations, for free, for purchase, for rent, or for a combination thereof. The plurality of game configurations may include, for instance, game maps, game utilities, playing terrains, playing tools (e.g., weapons), player capabilities, player avatars, and player utilities (e.g., social media connections). A user of the online gaming platform may be a player of video games, a vendor, or both. A user may create and/or distribute a video game, a game configuration, or both, by using the online gaming platform for user-based creation and/or distribution of games and game configurations. Each game configuration may be software code in a configuration file that includes, for instance, one or more of a settings file, a configuration file, a profile file, an applet file, an application file, a plug-in file, an application programming interface ("API") file, an executable file, a library file, an image file, a video file, a text file, a database file, a metadata file, and a message file.

In accordance with a first aspect of the invention, an apparatus is disclosed that is adapted to allow a user to play and configure a configurable video game using a game configuration through installation of a configuration file separate from video game software adapted to play the configurable video game without the game configuration, wherein the apparatus has electronics including hardware, such as a processor, memory, input means (e.g., a button, a keyboard, a touchpad, a joystick, a photosensor, a motion sensor, a camera, a microphone, a communication module, a data transfer device, etc.), output means (e.g., a light, a display, a speaker, a vibrator, etc.), and related software. Said electronics are adapted to execute the video game software, install the configuration file, and play and configure the configurable video game.

In an exemplary embodiment, the apparatus has networking capabilities and access to an online gaming platform, from which the apparatus may download a game configuration, and possibly access to a social media system. More specifically, an apparatus adapted for entertainment and education of a participant may comprise a video game console, having an exterior housing defining an interior compartment containing electronic circuitry; and a data transfer device adapted to interoperate with the electronic circuitry. The electronic circuitry may include an integrated electronic hardware system and an integrated software operating system stored and executable on the integrated electronic hardware system. The integrated electronic hardware system may include, for instance, an integrated camera, an integrated microphone, and an integrated speaker coupled to an internal processor coupled to an internal memory, an internal power source, an integrated data transfer module interoperable with the data transfer device, and at least one integrated input button operable from without the exterior housing. The software and the hardware may be adapted to enable a power user to set up the video game console, for example, to create in the software and store in the memory a first profile identifying a first participant; to download a game configuration from an online gaming platform; to select a game configuration for use with a video game; and to play a video game using a game configuration.

The data transfer device may be adapted to enable a data transfer between the video game console and a separate computing device, wherein the data transfer device may be adapted to enable the video game console to communicate with and transfer electronic data to the separate computing device and to enable the separate computing device to communicate with and transfer electronic data to the video game console. The data transfer device may include, for example, a wire cable, a wireless transceiver, or both. The video game console may be enabled to transfer to the separate computing device video game software and a game configuration file, and the separate computing device may be enabled to transfer to the video game console video game software and a game configuration file. The wire cable also may be adapted to enable the video game console to recharge the internal power source when the wire cable is coupled to an external power source.

In accordance with a second aspect of the invention, a system is disclosed that includes, for instance, an entertainment and educational system comprising an online gaming platform involving a marketplace comprising a plurality of vendors, a plurality of marketplace video games, and a plurality of game configurations; wherein each marketplace video game of the plurality of marketplace video games is available from at least one vendor of the plurality of vendors; wherein each game configuration of the plurality of game configurations is available from at least one vendor of the plurality of vendors for use with or within at least one configurable video game; and wherein each configurable video game is one of the plurality of marketplace video games available on the marketplace, or a third-party video game not available on the marketplace.

In an exemplary embodiment of the system, each vendor of the plurality of vendors may offer at least one marketplace video game, and/or at least one game configuration of the plurality of game configurations, for free, for purchase, for rent, or for a combination thereof. A game configuration may include, for instance, a game map (e.g., an ariel map, a road map, a topography map, a trail map, a resources map, a route map, a perspective view map, a plan view map, a point-of-view map, etc.), a game utility (e.g., switch points of view, reveal details, switch profiles, synchronization of accounts, etc.), a playing terrain (e.g., a city, a town, a village, a planet, a forest, a mountain, an ocean, a valley, a ghetto, a camp, an outpost, a mall, etc.), a playing tool (e.g., a weapon, a vehicle, a unit or type of ammunition, a unit or type of nutrition, etc.), a player capability (e.g., flying, jumping, swimming, telepathy, invisibility, teleportation, etc.), a player avatar (e.g., a warrior, a soldier, a spy, a ghoul, a troll, a giant, an alien, a monster, a vampire, a werewolf, a wizard, a witch, an elf, etc.), and a player utility (e.g., a social media connection, a message feed, etc.). A user of the online gaming platform may be a player of video games, a vendor, or both. A user may create and/or distribute a video game, a game configuration, or both, by using the online gaming platform for user-based creation and/or distribution of games and game configurations. Each game configuration may be software code in a configuration file that includes, for instance, one or more of a settings file, a configuration file, a profile file, an applet file, an application file, a plug-in file, an application protocol interface ("API") file, an executable file, a library file, an image file, a video file, a text file, a database file, a metadata file, and a message file. A user may develop the software code for the game configuration file using, for instance, programming in coding languages, such as JavaScript and HTML, including open-source code, or object-oriented code assembly. The software code would be adapted to be compatible with and executable by the video game software of a video game console on which a compatible video game may be played, with which or within which the game configuration would be used.

In an exemplary embodiment, the system may include the apparatus of the first aspect of the invention, in which the apparatus is adapted and configured to interact with the online gaming platform. In some embodiments, the system may include a social media platform, in which the apparatus is adapted and configured to interact with the social media platform. The apparatus may include, for instance, a video game console, such as an Xbox or a Nintendo Switch, or a personal computer allowing execution of cross-platform video games, possibly including "jail-broken" games, which may allow use of a game configuration from a first vendor in a video game of a competitor vendor. In some embodiments, the system may be adapted to enable, permit, and allow a user to play and execute a marketplace video game, and use a game configuration with or within the marketplace video game. The system further may be adapted to enable, permit, and allow a plurality of users to play a marketplace video game with each other, against each other, with one or more system-generated team members, against one or more system-generated opponents, or a combination thereof.

In accordance with a third aspect of the invention, a method for providing an online gaming platform is disclosed, in which the method includes providing an online marketplace; adapting the marketplace to accommodate a plurality of vendors; adapting the marketplace to offer a plurality of marketplace video games; adapting the marketplace to offer a plurality of game configurations, and adapting the marketplace to enable a vendor to offer a marketplace video game, a game configuration, or both; wherein each marketplace video game of the plurality of marketplace video games is available from at least one vendor of the plurality of vendors; wherein each game configuration of the plurality of game configurations is available from at least one vendor of the plurality of vendors for use with or within at least one configurable video game; and wherein each configurable video game is one of the plurality of marketplace video games available on the marketplace, or a third-party video game not available on the marketplace. In some embodiments, the online gaming platform further may be adapted in accordance with the second aspect of the invention.

In an exemplary embodiment, the method further may be adapted for entertainment and/or education of a participant, in which the method comprises providing an apparatus adapted for interaction with the participant, in which the apparatus may be configured in accordance with the first aspect of the invention; configuring the apparatus to interact within the system; configuring the apparatus to interact with the participant; enabling the apparatus to interact with the participant; and adapting the apparatus to electronically process video game data, game configuration data, audio data, video data, or a combination thereof, of an interaction of the apparatus with the participant. The method may further comprise providing a social media platform and adapting and configuring the apparatus to interact with the social media platform.

Further aspects of the invention are set forth herein. The details of exemplary embodiments of the invention are set forth in the accompanying drawings and the description below. Other features, objects, and advantages of the invention will be apparent from the description and drawings, and from the claims.

BRIEF DESCRIPTION OF THE DRAWINGS

By reference to the appended drawings, which illustrate exemplary embodiments of this invention, the detailed description provided below explains in detail various features, advantages, and aspects of this invention. As such, features of this invention can be more clearly understood from the following detailed description considered in conjunction with the following drawings, in which the same reference numerals denote the same, similar, or comparable elements throughout. The exemplary embodiments illustrated in the drawings are not necessarily to scale or to shape and are not to be considered limiting of its scope, for the invention may admit to other equally effective embodiments having differing combinations of features, as set forth in the accompanying claims.

LISTING OF DRAWING REFERENCE NUMERALS

Below are reference numerals denoting the same, similar or comparable elements throughout the drawings and detailed description of the invention:

| | | |
|---|---|---|
| 10000 | | an apparatus |
| | 10010 | a video game console |
| | 10012 | a configurable video game console |
| | 10020 | a participant |
| | 10030 | a power user |
| | 11000 | an exterior housing |
| | 12000 | an interior compartment |
| | 12100 | electronic circuitry |
| | 12110 | an integrated electronic hardware system |
| | 12111 | an integrated camera |
| | 12112 | an integrated microphone |
| | 12113 | an integrated speaker |
| | 12114 | an internal processor |
| | 12115 | an internal memory |
| | 12116 | an internal power source |
| | 12117 | an integrated data transfer module |
| | 12118 | an integrated input button |
| | 12119 | a mini display |
| | 12119' | an illumination device |
| | 12120 | an integrated software operating system |
| | 12130 | a dataset |
| | 12132 | a first profile |
| | 12134 | a configurable video game |
| | 12136 | a game configuration |
| | 13000 | a data transfer device |
| 20000 | | a configuration of an apparatus 10000 |
| | 21000 | a beginning detection |
| | 21100 | detecting the input button being activated |
| | 21200 | detecting a command being spoken |
| | 21300 | detecting motion proximate the camera |
| | 22000 | a beginning response |
| | 22100 | playing a greeting identifying the first participant |
| | 22200 | playing an instruction instructing the first participant to activate the input button |
| | 23000 | a subsequent response |
| | 23100 | recording a video of an interaction of the first participant with the apparatus |
| | 23200 | playing instructions |
| | 23300 | responding to responses of the first participant |
| | 24000 | an ending detection |
| | 24100 | detecting a farewell |
| | 24200 | detecting the input button being activated |
| | 25000 | an ending response |
| | 25100 | playing a reply farewell to the first participant |
| | 25200 | storing a recording of the interaction as an interaction audiovisual file as a computer-readable file on a computer-readable storage medium |
| 30000 | | a data transfer device |
| | 30010 | a wire cable |
| | 30020 | a wireless transceiver |
| 31000 | | a data transfer |
| | 31100 | electronic data |
| | 31110 | a separate device software application |
| | 31120 | an interaction audiovisual file |
| | 31130 | a settings dataset |
| | 31140 | an image file |
| | 31150 | a video game |
| | 31160 | a game configuration |
| 32000 | | a video game console |
| | 32100 | an internal power source |
| 33000 | | a separate computing device |
| 34000 | | an external power source |
| 40000 | | a computer environment |
| | 41000 | a data system |
| | 42000 | a network/Internet |
| | 43000 | a network connection |
| | 44000 | a computing device |
| | 44100 | a smart device |
| | 44200 | a mobile phone |
| | 44300 | a computer |
| | 45000 | a social media system |
| | 45100 | a social media account |
| | 45110 | social media data selected for delivery to user device |
| 50000 | | a data system |
| | 51000 | a computing device |
| | 51010 | a video game console |
| | 51100 | a processor |
| | 51200 | a memory |
| | 51300 | a volatile memory and a non-volatile memory |
| | 51400 | a removable storage |
| | 51500 | a non-removable storage |

-continued

| | |
|---|---|
| 51600 | a communications connection |
| 51700 | an input device |
| 51800 | an output device |
| 52000 | a network/Internet |
| 53000 | a server |
| 54000 | a database |
| 54100 | a database |
| 54200 | a database |
| 54300 | a database |
| 54400 | a database |
| 54500 | a database |
| 54600 | a database |

DETAILED DESCRIPTION OF THE INVENTION

The invention is directed to systems, methods and apparatus involving an online gaming platform and an apparatus adapted to operate as a configurable video game console having electronics, such as a keypad, buttons, a camera, a microphone, a speaker, and a transceiver, coupled to and controlled by a processor, with the apparatus adapted to be connectable to the online gaming platform, and preferably also connectable to a social media platform or system, in a networked environment.

In some embodiments of the present invention, a system is provided that comprises an online gaming platform that connects the video game console to vendors and users in a networked environment. The online gaming platform system may provide users features such as to share, save, alert, and configure activities of the video game console, including downloading video games and/or game configurations for use with configurable video games. The platform and system may provide a dashboard of, for instance, user activity, video game activity, and video game console status data.

In an exemplary embodiment of the invention, the apparatus embodies a video game console. The video game console may include an internal chargeable battery so that it is wireless and portable. With memberships to an online gaming platform, users can play and download video games and game configurations on the video game console. The users may share their video game activities on social media and by other electronic means. For instances, a user might create video game compilations of video games played using game configurations and share such compilations with other users. In some embodiments, video games and game configurations may be educational in nature and function as learning tools to develop, practice, or reinforce a user's skills or knowledge of specific information or content, such as a foreign language.

Numerous possible embodiments of the platform and system are envisioned. Exemplary users may include, for instance, video game players, video game developers, software programmers, video game vendors, adults, children, parents, family, relatives, friends, teachers, schools, and educators. For example, the apparatus may include a video game console, tablet computer, or laptop computer housing a computing device that is operable to play video games when activated by the user. The device may include a chargeable battery for ease of use. The device may connect to the online game platform via the Internet and may download or upload video games, game configurations, and other data or files to one of any number of online destinations, such as a website, a cloud service, a mobile app, and combinations thereof. The device may connect to a social media platform, which may include a membership option for members to obtain additional benefits. A membership option may include enabling access to the videos of video games being played, enabling access to a social media group specific to the user, and enabling access to other content specific to the apparatus. The online gaming platform may provide the membership option, may provide its own social media platform, and may connect to a third-party social media platform, service, or system.

Referring to the Figures, an apparatus may a computing device operable as a video game console, may be connectable to an online gaming platform via a networked environment, and may comprise part of a social media platform or system, which may include a data system, including at least one server and at least one database, and a network system, including computing devices in communication with each other via network connections.

Figure 1:
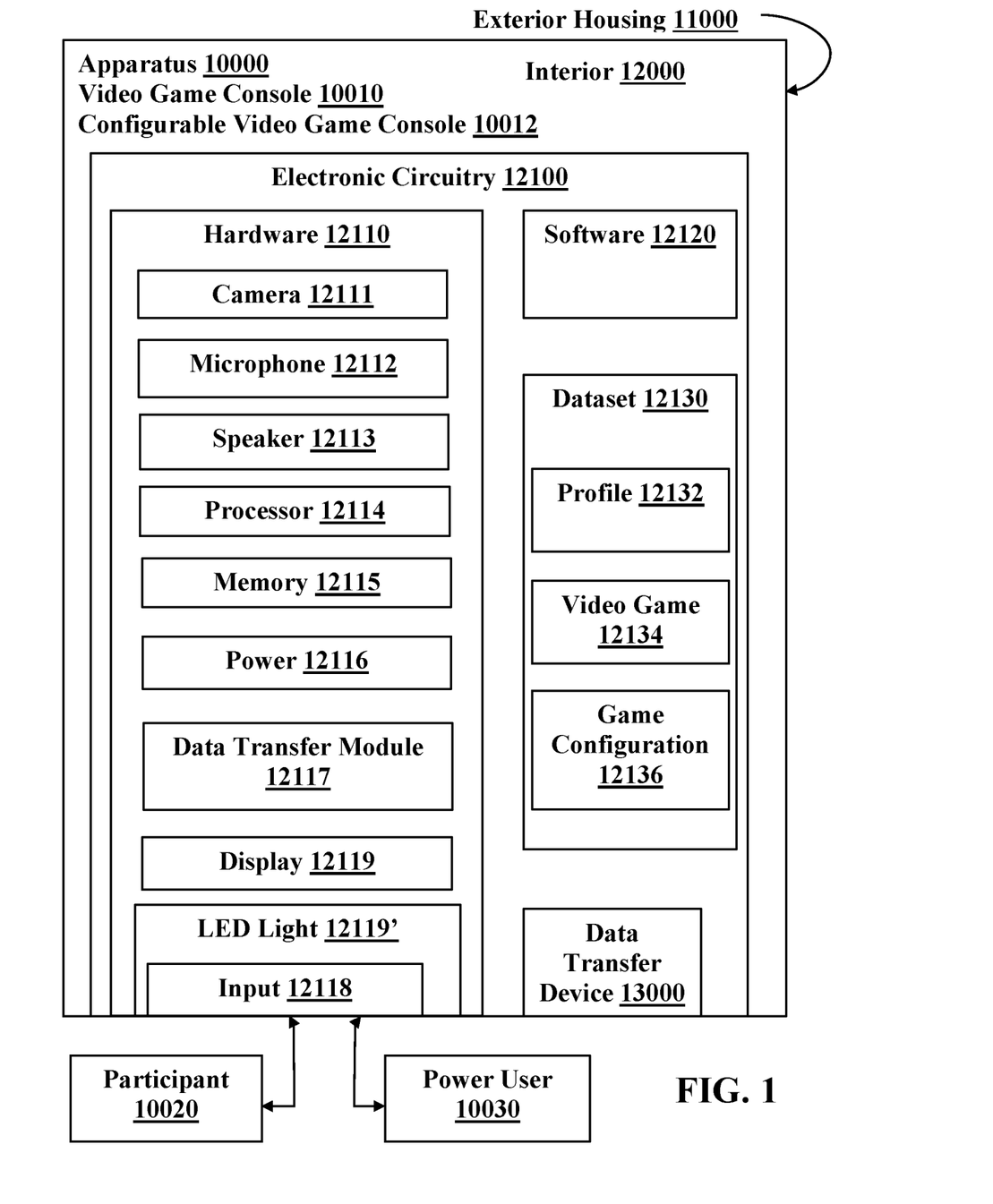
FIG. 1 shows a block diagram of an exemplary embodiment of an apparatus, according to aspects of the invention.

Referring to FIG. 1, FIG. 1 shows a block diagram of an apparatus 10000 adapted to operate as a video game console 10010, such as a Nintendo Switch, and more specifically a configurable video game console 10012 or other configurable gaming device like a laptop computer. The apparatus 10000 may be configured for interactive communication adapted for entertainment and education of participants 10020. As explained below, the apparatus 10000 may be a part of a larger system, such as an online gaming platform and/or a social media platform system. As depicted, the apparatus 10000 comprises a video game console 10010, having an exterior housing 11000, such as that of a configurable video game console 10012, and having an interior compartment 12000 containing electronic circuitry 12100. The apparatus 10000 includes a data transfer device 13000 adapted to interoperate with the electronic circuitry 12100. The electronic circuitry 12100 includes an integrated electronic hardware system 12110 and an integrated software operating system 12120 stored and executable on the integrated electronic hardware system 12110. The integrated electronic hardware system 12110 may include, for instance, an integrated camera 12111, an integrated microphone 12112, and an integrated speaker 12113 coupled to an internal processor 12114 coupled to an internal memory 12115 an internal power source 12116, an integrated data transfer module 12117 interoperable with the data transfer device 13000, and at least one integrated input device 12118 (e.g., button, keypad, keyboard, joystick, touchpad, etc.) operable from without the exterior housing 11000. The software 12120 and the hardware 12110 are adapted to enable a power user 10030 to set up the configurable video game console 10012, such as to create in the software 12120 and store in the memory 12115 a dataset 12130 including a first profile 12132 identifying a first participant 10020, and to download, install, select, and play a video game 12134 and a game configuration 12136 for, and compatible with, a configurable video game, such as video game 12134.

The hardware 12110 further may include a mini display 12119, and wherein the software 12120 is adapted to render on the display 12119, for instance, a video game playing, a settings menu, an audiovisual file, an image file, on-screen text, on-screen text-entry icons, or any combination thereof. In some embodiments, the display 12119 is touch-sensitive. Although the display 12119 may emit light, such as using a backlight or illuminated pixels, the hardware 12110 further may include a simple illumination device 12119' adapted to illuminate at least a portion of the exterior housing 11000. For instance, the illumination device 12119' may include a light emitting diode (LED) adapted to illuminate a portion of the exterior housing 11000 surrounding the input button 12118.

Various data settings of the apparatus 10000 may include creating the first profile 12132 to include, for example, entering a first name of the first participant and storing a first face image of a face of the first participant, and the camera 12111 and the software 12120 may be adapted to recognize the face of the first participant based on a comparison with the first face image. The user may associate the first face image with the user's profile for inclusion in the user's postings on the online gaming platform or social media system. Moreover, the game configuration 12136 may be specific to the user's profile and may be configured to load automatically upon recognizing the face of the first participant within a specified distance of the apparatus 10000.

Among other possible variations, the software 12120 may be further adapted to enable the power user 10030 to select one of a plurality of languages programmed into the software 12120; to select one of a plurality of games and game settings programmed into the software 12120; to set up the first profile by entering first profile parameters including a first gender, a first age, a first birthdate, a first race, a first ethnicity, or any combination thereof, of the first participant; and to configure the software 12120 to adjust interaction parameters based on the first profile parameters entered.

Technical variations may include, for example, having the camera 12111 and the software 12120 adapted to measure ambient light, motion, or both, such that the apparatus 10000 may be adapted to alternate between an inactive state and an active state based on measuring a presence or an absence of a minimum threshold of ambient light, motion, or both.

Figure 2:
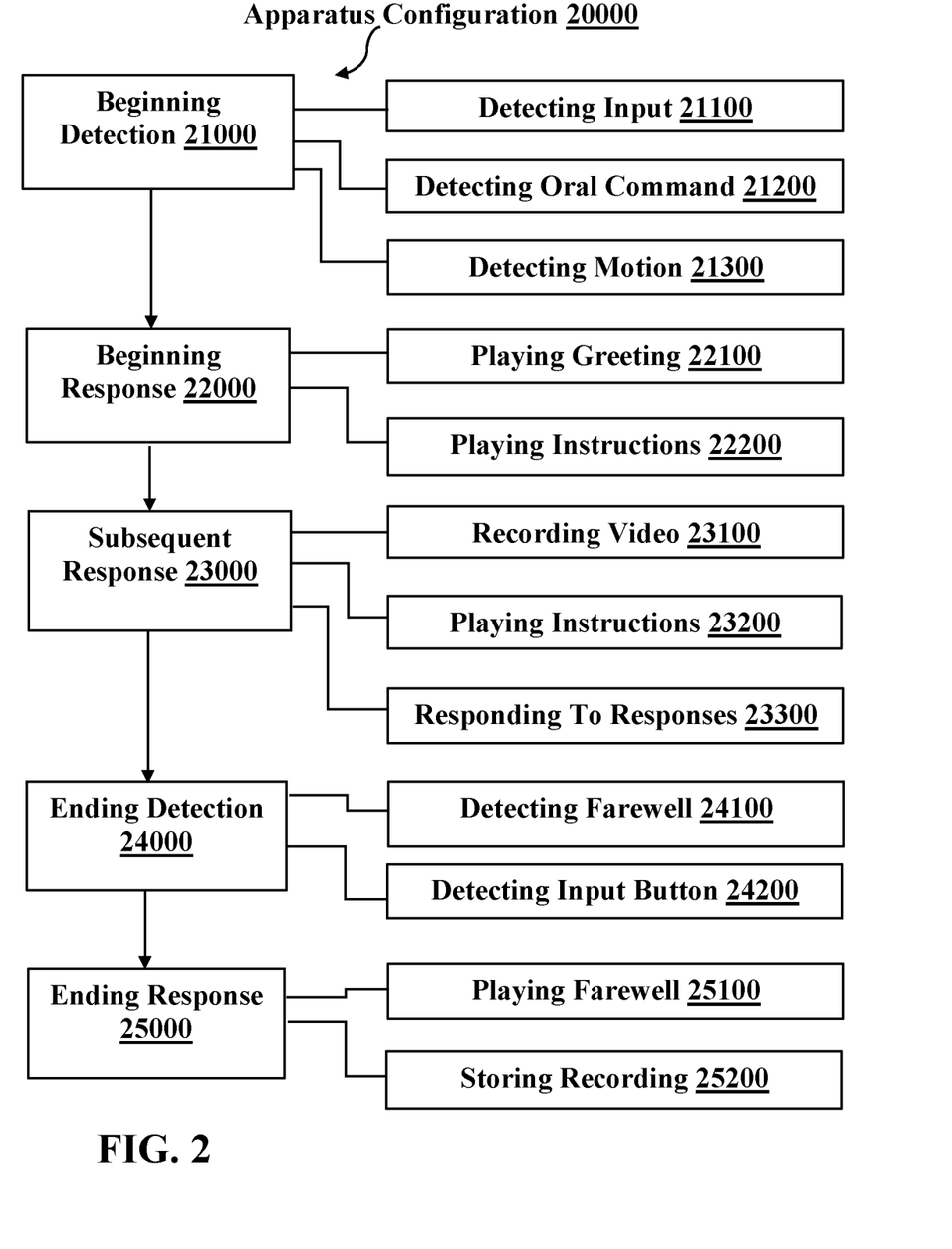
FIG. 2 shows a block diagram of a further embodiment of an apparatus configuration, according to prior art of the invention.

Referring to FIG. 2, FIG. 2 shows a flow diagram of an exemplary implementation of a configuration 20000 of the apparatus of FIG. 10000 according to aspects of the invention. The configuration 20000 may be adapted to perform, upon detecting a game configuration 12136, loading a game configuration beginning detection 21000, a game configuration beginning response 22000. For example, the beginning detection 21000 may include detecting the input button being activated (21100), detecting a command being spoken (21200), detecting motion proximate the camera (21300), or any combination thereof. Likewise, the beginning response 22000 may include using the speaker to play a greeting (22100) identifying the first participant 10020, to play an instruction (22200) instructing the first participant 10020 to activate the input button 12118 to launch the game configuration 12136, or both, upon detecting the beginning detection 21000. Following the beginning response 22000, the video game console 10010 may be adapted to perform a subsequent response 23000, such as record, as an interaction audiovisual file in the memory, a video (23100) of an interaction (e.g., game being played) of the first participant 10020 with the video game console 10010, during which interaction the video game console 10010 may use the speaker 12113 to play a plurality of verbal instructions or other recordings (23200) responsive to verbal responses (23300) of the first participant 10020.

The configured apparatus 20000 may be configured to have the software 12120 and the hardware 12110 further be adapted to enable a power user 10030 to set up the apparatus configuration 20000 to select an ending detection 24000 and an ending response 25000 to the ending detection 24000, wherein the apparatus configuration 20000 further is adapted to perform the ending response 25000 upon detecting the ending detection 24000. The ending detection 24000 may include, for instance, detecting a farewell being spoken (24100), detecting the input button being activated (24200), or both, and the ending detection 24000 may initiate the ending response 25000 that concludes an interaction of the configured apparatus 20000 with the first participant 10020. The ending response 25000 may include using the speaker to play a reply farewell to the first participant (25100) and storing a recording of the interaction as an interaction audiovisual file as a computer-readable file on a computer-readable storage medium (25200). The ending response 25000 might also include connecting to the Internet, connecting to a social media platform, and sending an alert to the power user to notify the power user that a participant has interacted with the apparatus 20000 and that a video of the interaction may be available on the social media platform and/or stored in the video game console.

Figure 3:
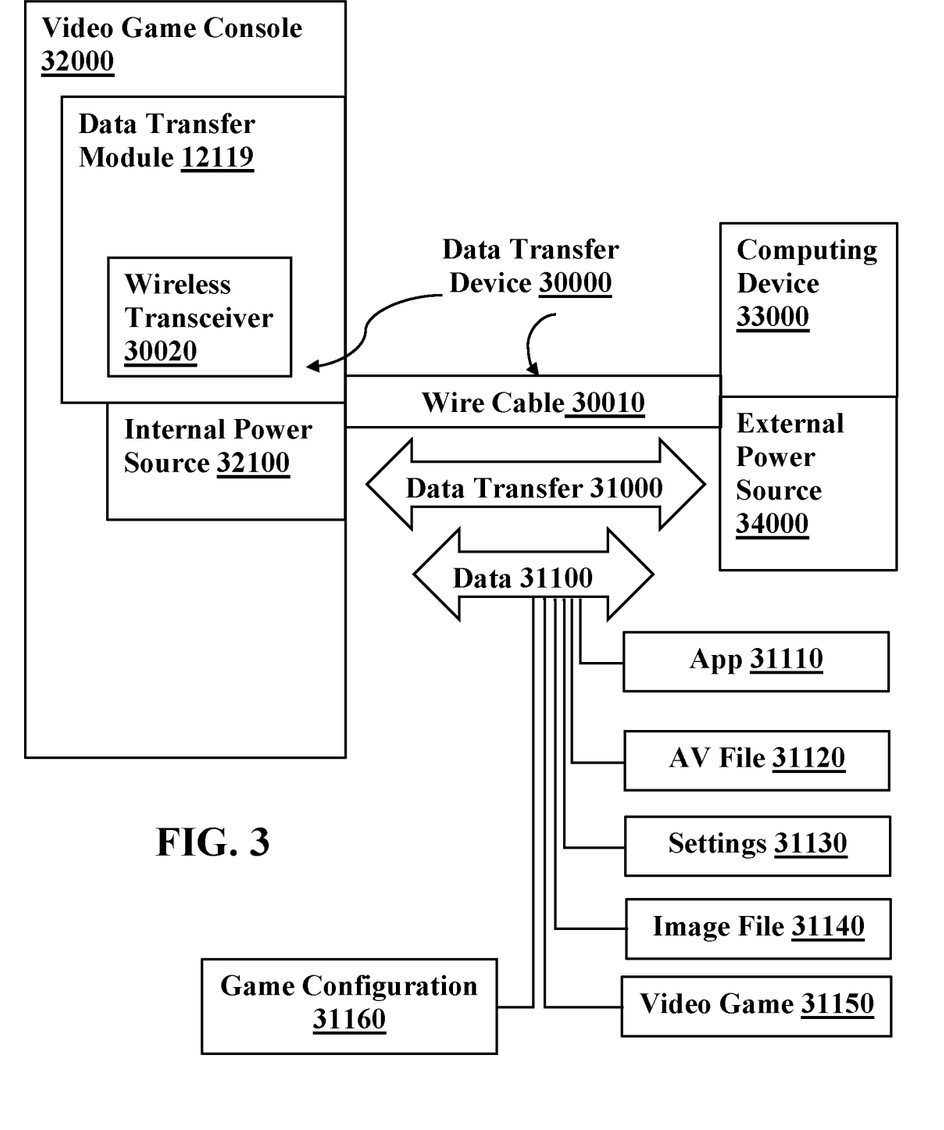
FIG. 3 shows a block diagram of another exemplary embodiment of the present invention, according to aspects of the invention.

Referring to FIG. 3, FIG. 3 shows a block diagram of an exemplary embodiment 30000 of the present invention specific to a data transfer device 13000. A data transfer device 30000 may be adapted to enable a data transfer 31000 between a video game console 32000 and a separate computing device 33000, such as a server of an online gaming platform, wherein the data transfer device 30000 may be adapted to enable the video game console 32000 to communicate with and transfer electronic data 31100 to the separate computing device 32000 and to enable the separate computing device 33000 to communicate with and transfer electronic data 31100 to the video game console 32000. The data transfer device 30000 may include, for instance, a wire cable 30010, a wireless transceiver 30020, or both, wherein the video game console 32000 may be enabled to transfer to, or receive from, the separate computing device 33000, for example, a separate device software application 31110 and an interaction audiovisual file 31120. Likewise, the separate computing device 33000 may be enabled to transfer to, or receive from, the video game console 32000, for instance, a settings dataset 31130 and an image file 31140. For example, an app 31110 might include a video game 31150, and settings 31130 might include a game configuration 31160. In addition, the wire cable 30010 may be adapted to enable the video game console 32000 to recharge an internal power source 32100 when the wire cable 30010 is coupled to an external power source 34000.

Figure 4:
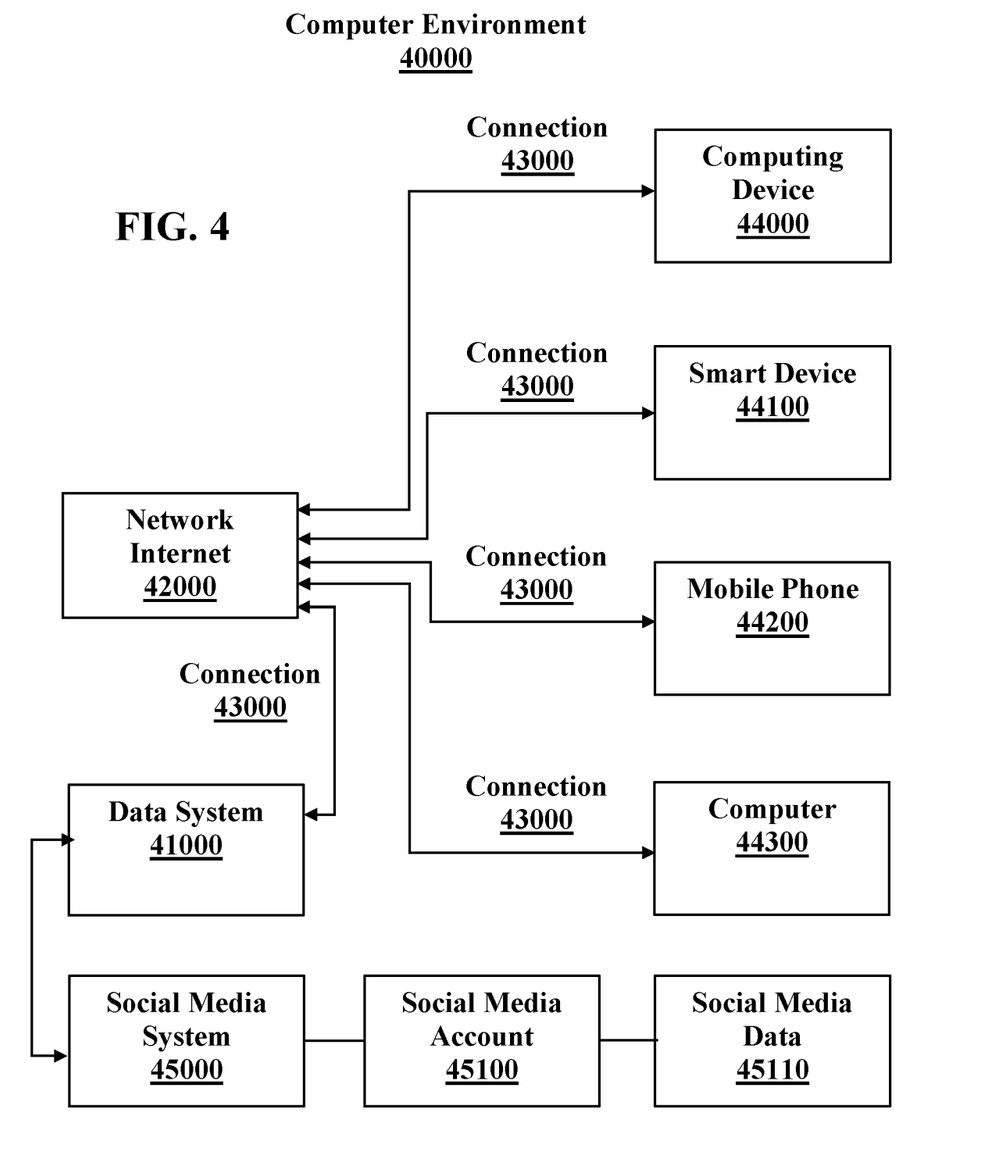
FIG. 4 shows a block diagram of an exemplary computer environment for use with the systems and methods in accordance with an embodiment of the present invention, and according to aspects of the invention.
Figure 5:
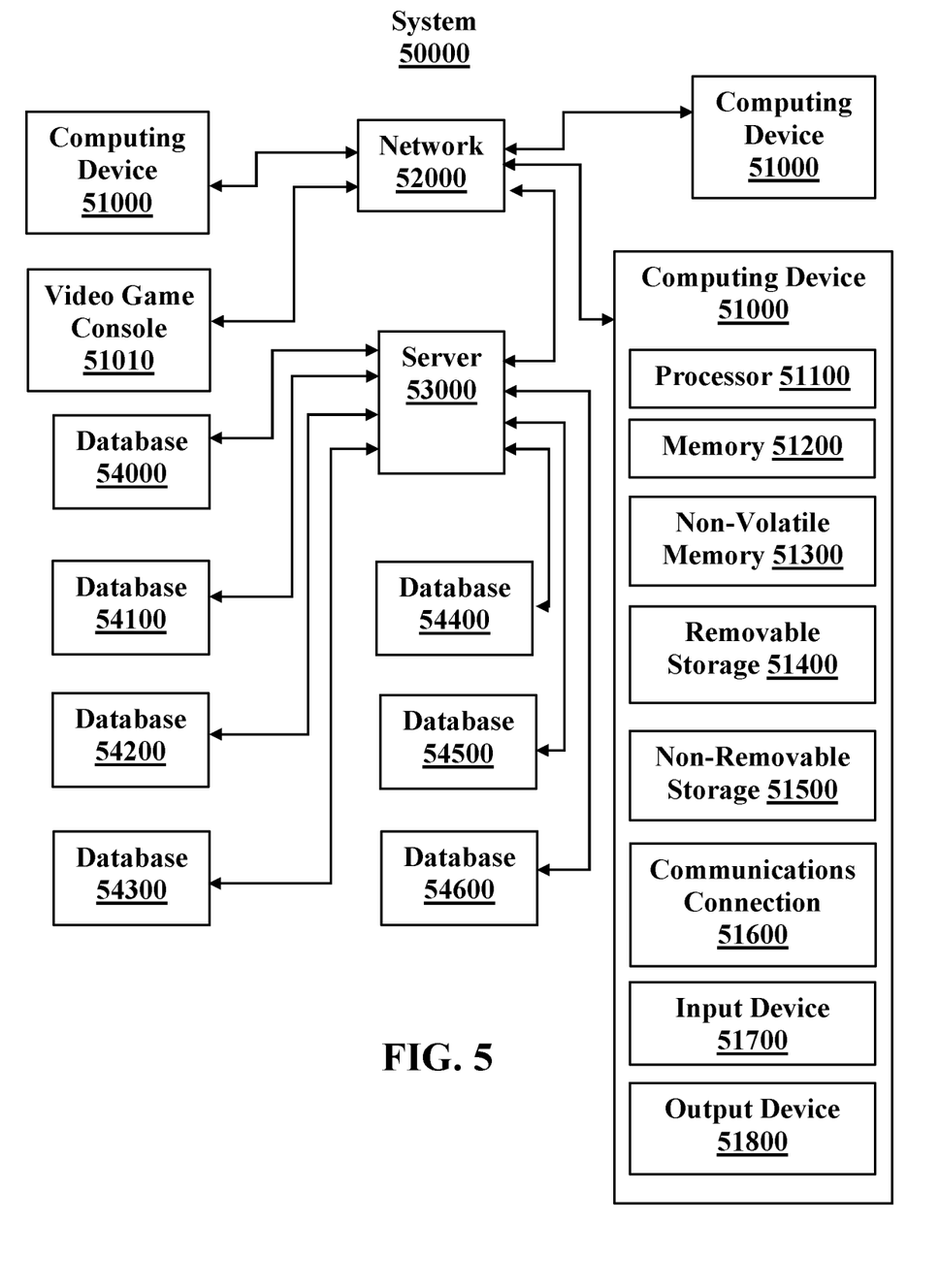
FIG. 5 shows a block diagram of an exemplary data system, and an exemplary set of databases/database tables for use with the exemplary computer environment, for use with systems and methods in accordance with an exemplary embodiment of the present invention, according to aspects of the invention.

Referring to FIGS. 4-5 below, exemplary embodiments of the present invention may include a system for interactive communication adapted for entertainment and education of a participant, wherein the system comprises an online gaming platform, and possibly an integrated social media platform, or a third-party social media platform or service, and an apparatus adapted to interact with online gaming platform and the social media platform. The system further may comprise a separate device software application running on at least one separate computing device, wherein the separate device software application may be adapted to enable the separate computing device to interact with the video game console, modify settings of the video game console, upload data and files to the video game console, download data and files from the video game console, and control features and functions of the video game console.

The system further may comprise a remote computing network and a user account platform accessible via the remote computing network and adapted to communicate with and transfer electronic data to and from the online gaming platform and the video game console, adapted to communicate with and transfer electronic data to and from the separate computing device, and adapted to enable the video game console to communicate with and transfer electronic data to and from the separate computing device via the remote computing network. The system further may comprise a user account accessible via the user account platform that enables the power user to log into the user account to remotely manage, view, and share data and settings of the video game console and the user's account on the online gaming platform that are available in the user account via the remote computing network, either because the data and settings have been uploaded to the user account platform, or because the video game console is in communication with the user account platform via the remote computing network while the power user is accessing the user account platform and logged into the user account. In some embodiments, the user account may be adapted to enable the power user to set alert options to have an alert generated and sent to the separate computing device if an interaction with the first participant happens and notification of the interaction has been communicated from a video game console and the user account platform via the remote computing network. The user account further may be adapted to enable the power user to email, upload, download, otherwise electronically share, or any combination thereof, a video game, a game configuration, or other data file, such as an interaction audiovisual file of a recording of an interaction of the first participant with the video game console.

The system further may comprise a game configuration data file stored on the remote computing network and downloadable from the user account platform to the separate computing device and to the video game console, wherein the game configuration data file is adapted to enable the video game console to add further features, perform additional functions, or both. A game configuration may include, for instance, a game map (e.g., an ariel map, a road map, a topography map, a trail map, a resources map, a route map, a perspective view map, a plan view map, a point-of-view map, etc.), a game utility (e.g., switch points of view, reveal details, switch profiles, synchronization of accounts, etc.), a playing terrain (e.g., a city, a town, a village, a planet, a forest, a mountain, an ocean, a valley, a ghetto, a camp, an outpost, a mall, etc.), a playing tool (e.g., a weapon, a vehicle, a unit or type of ammunition, a unit or type of nutrition, etc.), a player capability (e.g., flying, jumping, swimming, telepathy, invisibility, teleportation, etc.), a player avatar (e.g., a warrior, a soldier, a spy, a ghoul, a troll, a giant, an alien, a monster, a vampire, a werewolf, a wizard, a witch, an elf, etc.), and a player utility (e.g., a social media connection, a message feed, etc.). At the level of the video game console, the further features might be selected from the group consisting of further music recordings, further video recordings, further voice recordings, and further illumination patterns; and wherein the additional functions might be selected from the group consisting of additional alert options, additional rules options, additional language options, additional voice recognition options, and additional video recognition options.

A user of the online gaming platform may be a player of video games, a vendor, or both. A user may create and/or distribute a video game, a game configuration, or both, by using the online gaming platform for user-based creation and/or distribution of games and game configurations. Each game configuration may be software code in a configuration file that includes, for instance, one or more of a settings file, a configuration file, a profile file, an applet file, an application file, a plug-in file, an application protocol interface ("API") file, an executable file, a library file, an image file, a video file, a text file, a database file, a metadata file, and a message file. A user may develop the software code for the game configuration file using, for instance, programming in coding languages, such as JavaScript and HTML, including open-source code, or object-oriented code assembly. The software code would be adapted to be compatible with and executable by the video game software of a video game console on which a compatible video game may be played, with which or within which the game configuration would be used.

Referring to FIG. 4, FIG. 4 shows a diagram of an exemplary computer environment for use with the systems and methods in accordance with an embodiment of the present invention, and according to aspects of the invention. FIG. 4 illustrates a schematic diagram of an exemplary computer environment 40000 for creating, receiving, sending, exchanging, updating, and processing data in accordance with an embodiment of the present invention.

In the depicted embodiment, computer environment 40000 includes, inter alia, data system 41000, Internet 42000, connections 43000, and at least one computing device 44000, such as computing devices smart device/tablet/phone 44100, mobile phone 44200, and computer 44300. The data system 41000 may comprise an online gaming platform, possibly with its own integrated social media service, or connectable to a third-party social media system 45000. The network 42000 may connect to a social media system 45000 that accesses a social media account 45100 for the transfer of social media account data 45110. Computing devices 44100, 44200, and 44300 are connected to Internet 42000 via connections 43000, which may be any form of Internet connection known in the art or yet to be invented. Connections 43000 may include, but are not limited to, telephone lines (xDSL, T1, leased lines, etc.), cable lines, power lines, wireless transmissions, and the like. Computing devices 44100, 44200, and 44300 include any equipment necessary (e.g., modems, routers, etc.), as is known in the art, to facilitate such communication with the Internet. Data system 41000 is also connected to Internet 42000 using one of the aforementioned methods or other such methods known in the art.

Using an apparatus and a system such as at depicted in FIGS. 1, 4-5, a user may access the computer environment 40000 via a computing device connected to Internet 42000 such as computing device 44100, 44200, and 44300. Such a computing device may be, for instance, the individual's personal computer, an Internet café computer, an Apple iPod™, a computerized portable electronic device (e.g., a personal data assistant, cell phone, etc.), or the like. Using the apparatus and system exemplified in FIGS. 1 and 4-5, such user access may include a download of data to, and/or an upload of data (e.g., an electronic form of information) from, a computing device 44100, 44200, and 44300 via Internet 42000 to data system 41000 (e.g., server, mainframe, computer, etc.), wherein data system 41000 is typically provided and/or managed by the entity implementing the process or its affiliate, subcontractor, or the like.

However, alternate embodiments of user access may be substituted without departing from the scope hereof. For example, in one aspect of the present invention, the user transmits the data directly to the entity implementing the process in electronic format without upload (e.g., via electronic mail). Such transmission may also be performed at a computing device 44100, 44200, or 44300 via Internet 42000, however, in this scenario, manipulation by the entity's staff or systems may be required prior to transferring the information to data system 41000.

Although the systems and methods disclosed herein have focused on embodiments in which user access initiates the process, one of skill in the art may easily appreciate that such systems and methods may be equally applied for other scenarios in which the process is not initiated by the user.

Referring to FIG. 5, FIG. 5 shows a block diagram of an exemplary data system for use with systems and methods in accordance with an exemplary embodiment of the present invention, according to aspects of the invention. In addition, FIG. 5 shows an exemplary set of databases/database tables for use with the exemplary computer environment, in accordance with the exemplary embodiment of the present invention, according to aspects of the invention. FIG. 5 depicted herein represents an exemplary computing system environment for allowing a user of system 50000 to perform the methods described with respect to FIGS. 1-4.

The depicted computing system environment is only one example of a suitable computing environment and is not intended to suggest any limitation as to the scope of use or functionality. Numerous other general-purpose or special-purpose computing system environments or configurations may be used. Examples of well-known computing systems, environments, and/or configurations that may be suitable for use include, but are not limited to, personal computers ("PCs"), server computers, handheld or laptop devices, multi-processor systems, microprocessor-based systems, network PCs, minicomputers, mainframe computers, cell phones, tablets, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

FIG. 5 depicts an exemplary system 50000 for implementing embodiments of the present invention. This exemplary system includes, inter alia, one or more computing devices 51000, a network 52000, and at least one server 53000, which interface to each other via network 52000. A computing device 51000 may include an apparatus of a video game console 51010 such as described in the embodiments of FIGS. 1-3. In its most basic configuration, computing device 51000 includes at least one processing unit, processor 51100, and at least one memory unit 51200. Depending on the exact configuration and type of the computing device, memory 51200 may be volatile (such as random-access memory ("RAM")), non-volatile (such as read-only memory ("ROM"), flash memory, etc.), or some combination of the two. This most basic configuration is illustrated in FIG. 5 by dashed lines 51300. In addition to that described herein, computing devices 51000 can be any web-enabled handheld device (e.g., cell phone, smart phone, or the like) or personal computer including those operating via Android, Apple, and/or Windows mobile or non-mobile operating systems.

Computing device 51000 may have additional features/functionality. For example, computing device 51000 may include additional storage (removable and/or non-removable) including, but not limited to, magnetic or optical disks or tape, thumb drives, and external hard drives as applicable. Such additional storage is illustrated in FIG. 5 by removable storage 51400 and non-removable storage 51500.

Computing device 51000 typically includes or is provided with a variety of computer-readable media. Computer-readable media can be any available media that can be accessed by computing device 51000 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 51200, removable storage 51400, and non-removable storage 51500 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information, and which can accessed by computing device 51000. Any such computer storage media may be part of computing device 51000 as applicable.

Computing device 51000 may also contain a communications connection 51600 that allows the device to communicate with other devices. Such communications connection 51600 is an example of communication media. Communication media typically embodies computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 51000 may also have input device(s) 51700 such as keyboard, mouse, pen, camera, light sensor, voice input device, touch input device, etc. Output device(s) 51800 such as a display, speakers, printer, etc. may also be included. All these devices are generally known to the relevant public and therefore need not be discussed in any detail herein except as provided.

Notably, computing device 51000 may be one of a plurality of computing devices 51000 inter-connected by a network 52000. As may be appreciated, network 52000 may be any appropriate network and each computing device 51000 may be connected thereto by way of connection 51600 in any appropriate manner, and each computing device 51000 may communicate with one or more of the other computing devices 51000 in network 52000 in any appropriate manner. For example, network 52000 may be a wired network, wireless network, or a combination thereof within an organization or home, or the like, and may include a direct or indirect coupling to an external network such as the Internet or the like. Likewise, the network 52000 may be such an external network.

Computing device 51000 may connect to a server 53000 via such an internal or external network. Server 53000 may serve, for instance, as an online gaming platform, a social media service/platform, or both. Although FIG. 5 depicts computing device 51000 located in close proximity to server 53000, this depiction is not intended to define any geographic boundaries. For example, when network 52000 is the Internet, computing device can have any physical location. For example, computing device may be a tablet, cell phone, personal computer, or the like located at any user's office, home, or other venue, etc. Or computing device could be located proximate to server 53000 without departing from the scope hereof. Also, although FIG. 5 depicts computing devices 51000 coupled to server 53000 via network 52000, computing devices may be coupled to server 53000 via any other compatible networks including, without limitation, an intranet, local area network, or the like.

The system may use a standard client server technology architecture, which allows users of the system to access information stored in the relational databases via custom user interfaces. The application is hosted on a server such as server 53000 which is accessible via the Internet using a publicly addressable Uniform Resource Locator ("URL"). For example, users can access the system using any web-enabled device equipped with a web browser. Communication between software component and sub-systems are achieved by a combination of direct function calls, publish-and-subscribe mechanisms, stored procedures, and direct SQL queries.

In some embodiments, for instance, server 53000 may be an Edge R200 server as manufactured by Dell, Inc., however, alternate servers may be substituted without departing from the scope hereof. System 50000 and/or server 53000 utilize a PHP scripting language to implement the processes described in detail herein. However, alternate scripting languages may be utilized without departing from the scope hereof.

An exemplary embodiment of the present invention may utilize, for instance, a Linux variant messaging subsystem. However, alternate messaging subsystems may be substituted including, without limitation, a Windows Communication Foundation ("WCF") messaging subsystem of a Microsoft Windows operating system utilizing a .NET Framework 3.0 programming interface.

Also, in the depicted embodiment, computing device 51000 may interact with server 53000 via a Transmission Control Protocol/Internet Protocol ("TCP/IP") communications protocol; however, other communication protocols may be substituted.

Computing devices 51000 may be equipped with one or more Web browsers to allow them to interact with server 53000 via a HyperText Transfer Protocol ("HTTP"). HTTP functions as a request-response protocol in client-server computing. For example, a web browser operating on computing device 51000 may execute a client application that allows it to interact with applications executed by server 53000. The client application submits HTTP request messages to the server. Server 53000, which provides resources such as HTML files and other content, or which performs other functions on behalf of the client application, returns a response message to the client application upon request. The response typically contains completion status information about the request as well as the requested content. However, alternate methods of computing device/server communications may be substituted without departing from the scope hereof.

In the exemplary system 50000, server 53000 includes one or more databases 54000 as depicted in FIG. 5, which may include a plurality of database tables including, without limitation, Templates, Users, Events, User Uploads, Admin Info, Transactions, Status, Tracking, and/or Location database tables, e.g., 54100 through 54600. As may be appreciated, database(s) 54000 may be any appropriate database capable of storing data and it may be included within or connected to server 53000 or any plurality of servers similar to 53000 in any appropriate manner.

In the exemplary embodiment of the present invention depicted in FIG. 5, database(s) 54000 may be structured query language ("SQL") database(s) with a relational database management system, namely, MySQL as is commonly known and used in the art. Database(s) 54000 may be resident within server 53000. However, other databases may be substituted without departing from the scope of the present invention including, but not limited to, PostgreSQL, Microsoft® SQL Server 2008 MySQL, Microsoft® Access®, and Oracle databases, and such databases may be internal or external to server 53000.

The various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the interface unit generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a system 50000 or a distributed computing environment 40000. Still further, aspects of the presently disclosed subject matter may be implemented in or across a plurality of processing chips or devices, and storage may similarly be implemented across a plurality of devices in system 50000. Such devices might include personal computers, network servers, and handheld devices (e.g., cell phones, tablets, smartphones, etc.), for example.

In the exemplary embodiment, server 53000 and its associated databases are programmed to execute a plurality of processes including those shown in FIGS. 1-3 as discussed in greater detail herein.

Methods in accordance with aspects of the invention include, for instance, a method for interactive communication adapted for entertainment and education of a participant, wherein the method comprises providing an apparatus adapted for interaction with the participant, such as apparatus 10000; configuring the apparatus to interact with the participant; enabling the apparatus to interact with the participant; and capturing electronically in the apparatus audio data, video data, or both, of an interaction of the apparatus with the participant. Further embodiments of the method may include performing the actions associated the functionalities set forth in FIGS. 1-5, such as within the video game console apparatus 10000, within the computing environment 40000, and within the system 50000.

The foregoing description discloses exemplary embodiments of the invention. While the invention herein disclosed has been described by means of specific embodiments and applications thereof, numerous modifications and variations could be made thereto by those skilled in the art without departing from the scope of the invention set forth in the claims. Modifications of the above disclosed apparatus and methods that fall within the scope of the claimed invention will be readily apparent to those of ordinary skill in the art. Accordingly, other embodiments may fall within the spirit and scope of the claimed invention, as defined by the claims that follow hereafter.

In the description above, numerous specific details are set forth in order to provide a more thorough understanding of embodiments of the invention. It will be apparent, however, to an artisan of ordinary skill that the invention may be practiced without incorporating all aspects of the specific details described herein. Not all possible embodiments of the invention are set forth verbatim herein. A multitude of combinations of aspects of the invention may be formed to create varying embodiments that fall within the scope of the claims hereafter. In addition, specific details well known to those of ordinary skill in the art have not been described in detail so as not to obscure the invention. Readers should note that although examples of the invention are set forth herein, the claims, and the full scope of any equivalents, are what define the metes and bounds of the invention protection.

What is claimed:

1. An apparatus, the apparatus adapted to allow a user to play and configure a configurable video game, the apparatus comprising:
   electronic circuitry and hardware including:
      a processor;
      a memory, the memory coupled to the processor;
   electronic software, the software stored in the electronic circuitry and hardware and adapted to enable, drive, and control the electronic circuitry and hardware;
   a power supply connection, the power supply connection coupled to the electronic circuitry and hardware and couplable to a power supply; and
   a housing, the housing comprising an interior and an exterior housing, the interior containing the electronic circuitry and hardware, the software, and the power supply connection; and the exterior housing comprising a frame enclosing the interior;
   wherein the electronic circuitry and hardware are couplable to at least one input device and couplable to at least one output device;
   wherein the input device is selected from an input group consisting of a button, a keyboard, a touchpad, a joystick, a photosensor, a motion sensor, a camera, a microphone, a communication module, and a data transfer device;
   wherein the output device is selected from an output group consisting of a light, a display, a speaker, a vibrator, the communication module, and the data transfer device;
   wherein a configurable video game is stored in the memory;
   wherein the software is adapted to execute and enable playing of the configurable video game;
   wherein the software is adapted to configure the configurable video game;
   wherein the software is adapted to receive, store in the memory, and execute a game configuration file that encodes a game configuration for the configurable video game;
   wherein the game configuration file is adapted to be stored in the memory;
   wherein the game configuration file is adapted to be received from outside the apparatus and to be installed within the apparatus; and
   wherein the software is adapted to execute and enable playing of the configurable video game either with or without execution of the game configuration file.

2. The apparatus of claim 1, the apparatus further comprising:
   the communication module and the data transfer device having networking capabilities and enabling access to a network connecting to an online gaming platform;
   wherein the apparatus is adapted use the communication module and the data transfer device to access the online gaming platform to download the game configuration.

3. The apparatus of claim 2, wherein:
   the apparatus is adapted use the communication module and the data transfer device to access a social media system hosted on the network.

4. The apparatus of claim 1, wherein:
   the data transfer device comprises a wireless transceiver.

5. The apparatus of claim 1, wherein:
   each game configuration is selected from a game configuration group consisting of a game map, a game utility, a playing terrain, a playing tool, a player capability, a player avatar, and a player utility.

6. The apparatus of claim 1, wherein:
   each game configuration comprises software code in a game configuration file that includes one or more of a settings file, a configuration file, a profile file, an applet file, an application file, a plug-in file, an application programming interface ("API") file, an executable file, a library file, an image file, a video file, a text file, a database file, a metadata file, and a message file.

7. The apparatus of claim 1, wherein:
   a user is permitted to develop software code for each game configuration file using programming in coding languages encoding software code adapted to be compatible with and executable by video game software of a video game console on which a compatible video game may be played, with which or within which the game configuration would be used.

8. A system, the system adapted for use as an online gaming platform, the system comprising:
   a server; and
   an online marketplace hosted by the server,
   wherein the server comprises:
      server electronic circuitry and hardware including:
         a server processor;
         a server memory, the server memory coupled to the server processor;
         a server data transfer module, the server data transfer module coupled to the server processor;
         a server data transfer device, the server data transfer device coupled to the server processor;

server electronic software, the server software stored in the server electronic circuitry and hardware and adapted to enable, drive, and control the server electronic circuitry and hardware; and a server power supply connection, the server power supply connection coupled to the server electronic circuitry and hardware and couplable to a server power supply;

wherein the online marketplace comprises:
a plurality of vendors,
a plurality of marketplace video games; and
a plurality of game configurations;
wherein each marketplace video game of the plurality of marketplace video games is available to users from at least one vendor of the plurality of vendors;
wherein each game configuration of the plurality of game configurations is available to users from at least one vendor of the plurality of vendors for use by users with or within at least one configurable video game; and,
wherein each configurable video game is one of the plurality of marketplace video games available to users on the marketplace, or a third-party video game not available on the marketplace.

9. The system of claim 8, the system further comprising:
an apparatus, the apparatus adapted to be coupled to and in communication with the server;
wherein the apparatus comprises:
apparatus electronic circuitry and hardware including:
an apparatus processor;
an apparatus memory, the apparatus memory coupled to the apparatus processor;
an apparatus data transfer module, the apparatus data transfer module coupled to the apparatus processor;
an apparatus data transfer device, the apparatus data transfer device coupled to the apparatus processor;
apparatus electronic software, the apparatus software stored in the apparatus electronic circuitry and hardware and adapted to enable, drive, and control the apparatus electronic circuitry and hardware;
an apparatus power supply connection, the apparatus power supply connection coupled to the apparatus electronic circuitry and hardware and couplable to an apparatus power supply; and
an apparatus housing, the apparatus housing comprising an apparatus interior and an apparatus exterior housing, the apparatus interior containing the apparatus electronic circuitry and hardware, the apparatus software, and the apparatus power supply connection; and the apparatus exterior housing comprising an apparatus frame enclosing the apparatus interior.

10. The system of claim 9, wherein:
the apparatus data transfer device comprises an apparatus wireless transceiver.

11. The system of claim 9, the system further comprising:
a social media platform,
wherein the apparatus is adapted and configured to interact with the social media platform.

12. The system of claim 8, wherein:
each vendor of the plurality of vendors is adapted to offer at least one marketplace video game or at least one game configuration of the plurality of game configurations.

13. The system of claim 8, wherein:
a user of the online gaming platform comprises a player of video games, a creator, a vendor, or a combination thereof; and a user is permitted to create, to distribute, or both, a video game, a game configuration, or both, by using the online gaming platform for user-based creation and/or distribution of games and game configurations.

14. The system of claim 8, wherein:
each game configuration is selected from a game configuration group consisting of a game map, a game utility, a playing terrain, a playing tool, a player capability, a player avatar, and a player utility.

15. The system of claim 8, wherein:
each game configuration comprises software code in a game configuration file that includes one or more of a settings file, a configuration file, a profile file, an applet file, an application file, a plug-in file, an application programming interface ("API") file, an executable file, a library file, an image file, a video file, a text file, a database file, a metadata file, and a message file.

16. The system of claim 8, wherein:
a user is permitted to develop software code for each game configuration file using programming in coding languages encoding software code adapted to be compatible with and executable by video game software of a video game console on which a compatible video game may be played, with which or within which the game configuration would be used.

17. A method, the method for providing an online gaming platform adapted to allow a user to acquire and configure a configurable video game, the method comprising:
providing a server;
providing an online marketplace accessible via the server;
adapting the online marketplace to accommodate a plurality of vendors;
adapting the online marketplace to offer a plurality of marketplace video games;
adapting the online marketplace to offer a plurality of game configurations; and
adapting the online marketplace to enable a vendor to offer a marketplace video game, a game configuration, or both;
wherein the server comprises:
server electronic circuitry and hardware including:
a server processor;
a server memory, the server memory coupled to the server processor;
a server data transfer module, the server data transfer module coupled to the server processor;
a server data transfer device, the server data transfer device coupled to the server processor;
server electronic software, the server software stored in the server electronic circuitry and hardware and adapted to enable, drive, and control the server electronic circuitry and hardware; and
a server power supply connection, the server power supply connection coupled to the server electronic circuitry and hardware and couplable to a server power supply;
wherein the online gaming platform comprises a system comprising:
the server; and
the online marketplace hosted by the server; and
wherein the online marketplace comprises:
the plurality of vendors,
the plurality of marketplace video games; and
the plurality of game configurations;
wherein each marketplace video game of the plurality of marketplace video games is available to users from at least one vendor of the plurality of vendors;

wherein each game configuration of the plurality of game configurations is available to users from at least one vendor of the plurality of vendors for use by users with or within at least one configurable video game; and, wherein each configurable video game is one of the plurality of marketplace video games available to users on the marketplace, or a third-party video game not available on the marketplace.

18. The method of claim 17, the method further comprising:
providing an apparatus adapted for interaction with the user who is a participant, the apparatus adapted to be coupled to and in communication with the server;
configuring the apparatus to interact within the system accessible via the server;
configuring the apparatus to interact with the participant;
enabling the apparatus to interact with the participant; and,
adapting the apparatus to electronically process video game data, game configuration data, audio data, video data, or a combination thereof, of an interaction of the apparatus with the participant;
wherein the apparatus comprises:
apparatus electronic circuitry and hardware including:
an apparatus processor;
an apparatus memory, the apparatus memory coupled to the apparatus processor;
an apparatus data transfer module, the apparatus data transfer module coupled to the apparatus processor;
an apparatus data transfer device, the apparatus data transfer device coupled to the apparatus processor;
apparatus electronic software, the apparatus software stored in the apparatus electronic circuitry and hardware and adapted to enable, drive, and control the apparatus electronic circuitry and hardware;
an apparatus power supply connection, the apparatus power supply connection coupled to the apparatus electronic circuitry and hardware and couplable to an apparatus power supply; and
an apparatus housing, the apparatus housing comprising an apparatus interior and an apparatus exterior housing, the apparatus interior containing the apparatus electronic circuitry and hardware, the apparatus software, and the apparatus power supply connection; and the apparatus exterior housing comprising an apparatus frame enclosing the interior.

19. The method of claim 18, the method further comprising:
providing a social media platform in the system; and,
adapting and configuring the apparatus to interact with the social media platform.

\* \* \* \* \*